US008441930B2

(12) United States Patent
Li et al.

(10) Patent No.: US 8,441,930 B2
(45) Date of Patent: May 14, 2013

(54) ESTIMATING COMMUNICATION CONDITIONS

(75) Inventors: Jin Li, Sammamish, WA (US); Humayun Mukhtar Khan, Issaquah, WA (US); Guo-Wei Shieh, Sammamish, WA (US); Manish Jain, Malden, MA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 12/643,433

(22) Filed: Dec. 21, 2009

(65) Prior Publication Data

US 2011/0149751 A1 Jun. 23, 2011

(51) Int. Cl.
*H04J 3/14* (2006.01)

(52) U.S. Cl.
USPC ........ 370/235; 370/229; 370/231; 370/230.1; 370/242

(58) Field of Classification Search .................. 370/252, 370/229, 231, 235, 230.1
See application file for complete search history.

(56) References Cited

U.S. PATENT DOCUMENTS

| | | | |
|---|---|---|---|
| 6,345,279 B1 | 2/2002 | Li et al. | |
| 6,404,738 B1 | 6/2002 | Reininger et al. | 370/236 |
| 6,564,263 B1 | 5/2003 | Bergman et al. | |
| 6,597,660 B1 | 7/2003 | Rueda | |
| 6,898,213 B1 * | 5/2005 | Shimelmitz et al. | 370/537 |
| 6,970,602 B1 | 11/2005 | Smith et al. | |
| 7,035,211 B1 | 4/2006 | Smith et al. | 370/230 |
| 7,039,715 B2 | 5/2006 | England et al. | 709/232 |
| 7,069,014 B1 | 6/2006 | Thenthiruperai et al. | |
| 7,130,268 B2 | 10/2006 | Mascolo | |
| 2002/0141452 A1 * | 10/2002 | Mauritz et al. | 370/503 |
| 2003/0063564 A1 | 4/2003 | Ha et al. | 370/230 |
| 2003/0152096 A1 | 8/2003 | Chapman | 370/412 |
| 2003/0185214 A1 | 10/2003 | Yang et al. | 370/395.4 |
| 2004/0062207 A1 * | 4/2004 | Gross | 370/252 |
| 2004/0085964 A1 | 5/2004 | Vaananen | 370/395.4 |
| 2004/0214555 A1 | 10/2004 | Kumar | |
| 2005/0100056 A1 | 5/2005 | Chuberre | |
| 2005/0228896 A1 | 10/2005 | Nishida | |
| 2006/0221820 A1 | 10/2006 | Zeitak | |
| 2007/0081462 A1 | 4/2007 | Gefflaut | |
| 2007/0180119 A1 | 8/2007 | Khivesara et al. | 709/226 |
| 2007/0242616 A1 * | 10/2007 | Chang et al. | 370/252 |
| 2008/0049614 A1 | 2/2008 | Briscoe | |
| 2008/0259813 A1 | 10/2008 | Matta | |
| 2009/0164657 A1 * | 6/2009 | Li et al. | 709/233 |
| 2009/0316578 A1 | 12/2009 | Mang et al. | 370/230 |
| 2011/0153863 A1 | 6/2011 | Khan et al. | 709/232 |

OTHER PUBLICATIONS

Office Action mailed Jul. 7, 2011, in co-pending U.S. Appl. No. 12/643,406.

(Continued)

*Primary Examiner* — Huy D Vu
*Assistant Examiner* — Omer Mian
(74) *Attorney, Agent, or Firm* — Merchant & Gould

(57) ABSTRACT

Embodiments are configured to provide communication features, including providing channel condition estimates for a communication path, such as packet loss, jitter, and/or available bandwidth, but are not so limited. In an embodiment, a method uses aspects of in-band data packets to provide channel condition estimates. In one embodiment, a system includes a bandwidth estimation component that operates to classify payload packets as part of performing capacity estimation and available bandwidth estimation operations.

20 Claims, 6 Drawing Sheets

OTHER PUBLICATIONS

Notice of Allowance mailed Dec. 27, 2011, in co-pending U.S. Appl. No. 12/643,406.

Martin Prangl et al., "Fast Adaptation Decision Taking for Cross-Modal Multimedia Content Adaption," ICME, Jul. 2006, 4 pages.

Susan McRoy et al., "Multimodal Content Adaptations for Heterogeneous Devices," Sep. 6, 2005, 34 pages.

Anthony J. Solon et al., "Bandwidth Determined Transmoding Through Fuzzy logic in Mobile Intelligent Multimedia Presentation Systems," Artif Intell Rev, vol. 26, 2006, pp. 325-363.

Maya Yajnik et al., "Measurement and Modelling of the Temporal Dependence in Packet Loss", UMASS CMPSCI Technical Report 98-78, 1998, pp. 1-22.

Sue B. Moon et al., "Correlation of Packet Delay and Loss in the Internet", Unv. of Mass., CMPSCI, Technical Report 98-11, Jan. 1998, pp. 1-12.

Manish Jain et al., "End-to-End Available Bandwidth: Measurement Methodology, Dynamics, and Relation with TCP Throughput", IEEE/ACM Transactions on Networking, vol. 11, No. 4, Aug. 2003, pp. 537-549.

Jörg Widmer et al., "End-to-end Congestion Control for Flows with Variable Packet Size", Technical Report, ID: IC/2002/82, 41 pages.

Jacob Strauss et al., "A Measurement Study of Available Bandwidth Estimation Tools," IMC, 2003, Oct. 27-29, 2003, 6 pages.

Li Lao et al., "The Probe Gap Model Can Underestimate the Available Bandwidth of Multihop Paths", ACM SIGCOMM Computer Communication Review, 2006, 6 pages.

Ningning Hu et al. "Locating Internet Bottlenecks: Algorithms, Measurements, and Implications", SIGCOMM '04, Aug. 30-Sep. 3, 2004, 14 pages.

Minghua Chen et al., "Multiple TFRC Connections Based Rate Control for Wireless Networks", IEEE Transactions on Multimedia, vol. 8, No. 5, Oct. 2006, pp. 1045-1062.

Cheng Jin et al., "FAST TCP: Motivation, Architecture, Algorithms, Performance", IEEE INFOCOM, 2004.

Tom Auld et al., "Bayesian Neural Networks for Internet Traffic Classification," IEEE Transactions on Neural Networks, vol. 18, No. 1, Jan. 2007, pp. 223-239.

Andrew W. Moore et al., "Internet Traffic Classification Using Bayesian Analysis Techniques," Sigmetrics'05 Jun. 6-10, 2005.

* cited by examiner

ESTIMATING COMMUNICATION CONDITIONS

BACKGROUND

Computer networking technology continues to evolve, enabling users to interact as part of real-time collaboration environments. For example, web-based application users can remotely participate in online presentations (desktop sharing for example), web conferences, and/or real time voice (voice-over-internet-protocol (VOIP)) and video calls. Networked, distributed, and other communication environments can be subject to various networking conditions (e.g., jitter, packet losses, congestion, etc.). Generally, each participant's experience is dictated in part by the communication equipment (e.g., hardware, software, etc.) and functionality of some communication path being used. Users can become frustrated with unacceptable interactive experiences caused in part by network, application, and/or device limitations.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide communication features, including providing channel condition estimates for a communication path, such as packet loss, jitter, and/or available bandwidth, but are not so limited. In an embodiment, a method uses aspects of in-band data packets to provide channel condition estimates. In one embodiment, a system includes a bandwidth estimation component that operates to classify payload packets as part of performing capacity estimation and available bandwidth estimation operations.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
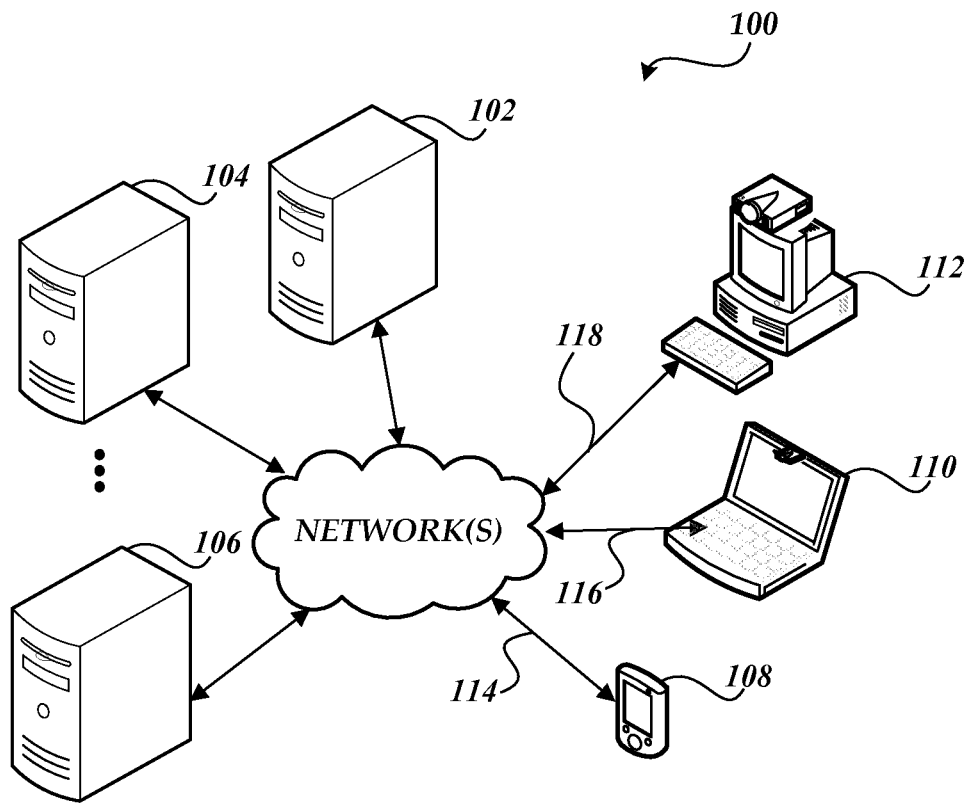
FIG. 1 is a block diagram of an exemplary communication environment.

FIG. 1 is a block diagram of an exemplary communication environment 100. In an embodiment, components of the communication environment 100 operate to provide an estimate of an amount of available communication bandwidth, but the components are not so limited. As shown, the exemplary communication environment 100 includes a network of computing devices/systems and associated communication infrastructure. For example, the environment 100 may include multiple communication networks, a number of server components (e.g., web server 102, collaboration server 104, file server 106, etc.), and/or client devices/systems having various communication functionalities (e.g., smart phone 108, laptop 110, desktop 112, etc.). The communication environment 100 of one embodiment provides real-time communication features that include audio, video, application sharing, and/or file transfer features.

As shown by the example of FIG. 1, the smart phone 108 is coupled to the network via communication channel or end-to-end path 114, laptop 110 is coupled to the network via communication channel or end-to-end path 116, and the desktop 112 is coupled to the network via communication channel or end-to-end path 118. It will be appreciated that each end-to-end path can include a number of communication links, pathways, and/or other components that contribute to an amount of communication bandwidth available on each communication path. Exemplary communication environments can include the use of secure networks, unsecure networks, hybrid networks, and/or some other network or combination of networks. By way of example, and not limitation, the environment 100 can include wired media such as a wired network or direct-wired connection, and/or wireless media such as acoustic, radio frequency (RF), infrared, and/or other wireless media.

As an example, components of a public and/or private packet network can be used for audio conferencing, video conferencing, audio/video conferencing, collaborative application sharing, and file transfers. In an exemplary implementation, a packet network can be coupled to a Public Switched Telephone Network (PSTN) via one or more suitable gateways (e.g., VOIP gateways) arranged to convert between circuit-switched information and packet information. Each participant may be using various types of wired and/or wireless communications links operating at varying connection speeds or bandwidths (e.g., PSTN connection, a direct service line (DSL) modem connection, a cable modem connection, a local area network (LAN) connection, wide area network (WAN) connection, etc.).

According to an embodiment, components of the environment 100 can use a bandwidth estimation component to provide an estimate of an amount of communication bandwidth available to one or more communicating users of the environment 100. For example, the bandwidth estimation component can be used to provide an estimate of an amount of communication bandwidth available to a smart phone user and a desktop user who are communicating over an end-to-end path as part of a live conference event. In one embodiment, the bandwidth estimation component can be used to estimate an amount of available bandwidth of a real-time communication session (e.g., voice over Internet protocol (VOIP), video conferencing, real-time conference with multiple communication modalities, etc.).

The bandwidth estimation component of one embodiment can use in-band communication traffic parameters and other information when providing an estimate of available bandwidth as part of facilitating communication operations. For example, the bandwidth estimation component can use payload traffic and/or other communication parameters to provide a bandwidth estimate to bandwidth allocation and distribution components. In one embodiment, the bandwidth estimation component can operate to provide an adaptive bandwidth estimate in part by using a classification technique to classify and/or use aspects of payload traffic. For example, the bandwidth estimation component can use characteristics of payload packets communicated between communicating participants as part of providing capacity and bandwidth estimation information.

In an embodiment, as part of providing an adaptive bandwidth estimate, the bandwidth estimation component classifies communication packets based in part on a number of packet classes, but is not so limited. For example, the bandwidth estimation component can use a histogram-based operational feature to classify received communication packets into various categories or groupings. The bandwidth estimation component of one embodiment uses parameters of received probe packets as part of classifying communication packets based in part on a first packet class that identifies communication packets that experience minimal, negligible, and/or zero amounts of congestion. For example, packets included in the first packet class have traversed the communication path (e.g., received at the receiver and used as an input to the bandwidth estimation component) in an amount of time that is less than a defined congestion threshold (e.g., minimum delay time, non-congested packets, etc.).

According to such an embodiment, the bandwidth estimation component further classifies the communication packets based in part on a second packet class that identifies communication packets that are subject to amounts of congestion. For example, packets included in the second packet class have traversed the communication path in an amount of time that is equal to or greater than the defined congestion threshold or other criteria. Correspondingly, characteristics of packets communicated during a communication session (e.g., transmitting user to receiving user or other communication component(s) (e.g., server, gateway, etc.)), can be utilized in providing capacity and bandwidth estimates, as discussed below.

The bandwidth estimation component of one embodiment can use packet information of packets associated with the first packet class to obtain a capacity estimate for use in estimating available bandwidth amounts for a communication session. For example, the bandwidth estimation component can use packet parameters of packets included in the first packet class to provide tight link capacity estimates. The bandwidth estimation component can also use packet information of packets associated with the second packet class to obtain an estimate of an amount of available communication bandwidth associated with a particular communication session, but is not so limited. For example, the bandwidth estimation component can use packet parameters of packets included in the second packet class in conjunction with a capacity estimate to provide a communication bandwidth estimate for an end-to-end communication path.

Accordingly, the bandwidth estimation component can use the packet classes and/or various packet parameters to provide a quick and useable estimate of the available bandwidth of the communication session. In an exemplary implementation, the bandwidth estimation component can be included as part of a communication client operating on a communication device or system to provide a bandwidth estimate. In another exemplary implementation, the bandwidth estimation component can be included as part of a server-based communication infrastructure as part of facilitating or controlling communications between communicating users.

The bandwidth estimation component of an embodiment can use a capacity parameter and an available bandwidth parameter to provide bandwidth estimation and other information associated with a communication session. For example, assume that a communication channel is defined by an end-to-end path that includes links L1, L2, ..., Ln. For this example, assume that the capacity of each link is C1, C2, ..., Cn, and the traffic load of each link is B1, B2, ..., Bn.

A narrow link can be defined as a link having a minimum capacity relative to other link capacities, where:

$$Cb = \min(C1, C2, \ldots, Cn).$$

A tight link can be defined as a link having a minimum amount of residual bandwidth relative to other link residuals, where $$A = Ct - Bt = \min(C1-B1, C2-B2, \ldots, Cn-Bn).$$

Residual bandwidth can be defined as an amount of bandwidth remaining as part of a communication operation or operations. For example, a first link (e.g., capacity of 100 Mbps) and a second link (e.g., capacity of 10 Mbps), wherein the first link is used rarely and has an associated residual bandwidth of 9 Mbps, and the second is used frequently and has an associated residual bandwidth of 2 Mbps. For such an example, the second link is referred to as a tight link having less residual bandwidth as compared to the first link. As one example, the bandwidth estimation component can use a capacity value of a narrow link when determining and providing an estimate of the capacity of an end-to-end communication path, such as the communication path defined by path 114 and path 116 for example. Additionally, the bandwidth estimation component can use a minimum residual bandwidth amount or value of the tight link (e.g., Ct−Bt) when determining and providing an estimate of the amount of available bandwidth of the end-to-end communication path.

In one embodiment, the bandwidth estimation component can use the capacity of an end-to-end communication path as an upper bound when providing an amount of available communication bandwidth estimate, but is not so limited. Correspondingly, components of the environment 100 can use information provided by the bandwidth estimation component when allocating communication bandwidth to communication participants as part of providing an interactive communication experience under various network and/or communication conditions. For example, the bandwidth estimation component can provide an estimate of an amount of available bandwidth as part of providing a real-time video conference (e.g., audio, video, application sharing, etc.), so that various communication components can adjust coding rates or features as part of controlling the use of the available bandwidth.

Figure 2:
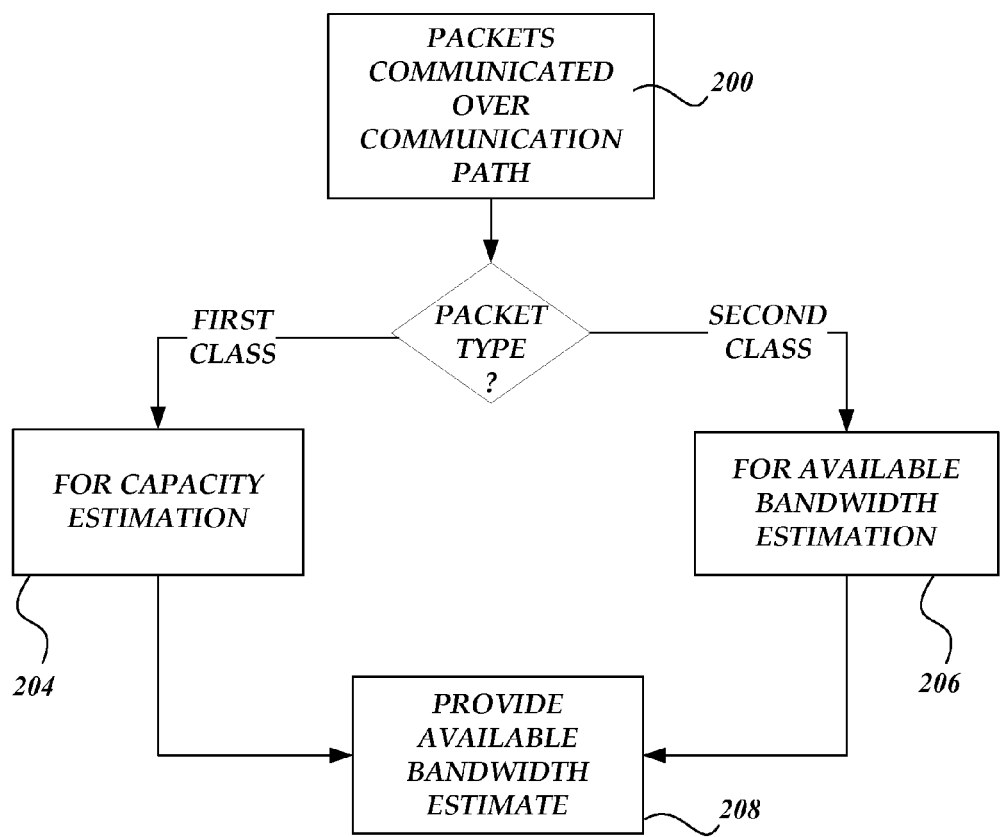
FIG. 2 is a flow diagram illustrating an exemplary process of estimating parameters of a communication environment.

FIG. 2 is a flow diagram illustrating an exemplary process of estimating parameters of a communication environment. For example, the exemplary process can be used to estimate amounts of available bandwidth available to communication participants interacting as part of a real-time communication session. As shown in FIG. 2, and according to one embodiment at 200, a number of payload packets are used as part of determining an estimate of an amount of available communication bandwidth. For example, a communication operation can include determining an available bandwidth estimate based in part on aspects of received packet pairs during an initialization process used before providing real-time interactive communication functionality to communication participants.

At 202, a bandwidth estimator or estimating component can use a packet determination operation as part of classifying packets using two distinct packet categories or classes, but is not so limited. The bandwidth estimator of one embodiment can use a packet throughput assessment process to classify packets into the classes, wherein the classification is based in part on an amount of time required to communicate each packet over a defined communication path during the communication of multiple packets (e.g., 100 packets).

For example, the bandwidth estimator can use a histogram model to determine the communicated packets that have experienced some amount of unacceptable delay (e.g., packets having unacceptable throughput values or congested packets) and the communicated packets that have not experienced unacceptable delay (e.g., packets having an acceptable throughput values or non-congested packets). Exemplary packets having acceptable throughput values typically experience minimal to no jitter, minimal to no packet loss, and/or minimal to no burst packet loss, etc.

At 204, the bandwidth estimator uses all or some portion of the packets of the first class to determine a capacity estimate or estimation for the communication session. At 206, the bandwidth estimator uses all or some portion of the packets of the second class to determine the available bandwidth of the communication session. For example, the bandwidth estimator can use the normal payload traffic to determine capacity and available bandwidth estimates, rather than using specific measuring packets to obtain estimates.

At 208, the bandwidth estimator can use the capacity estimates and available bandwidth values to provide available bandwidth estimates for use in controlling aspects of the communication session. For example, information provided by the bandwidth estimator can be used to control allocations of available bandwidth to various communication modalities during a real-time communication session. While a certain number and order of operations is described for the exemplary flow of FIG. 2, it will be appreciated that other numbers and orders can be defined according to a desired implementation.

Figure 3:
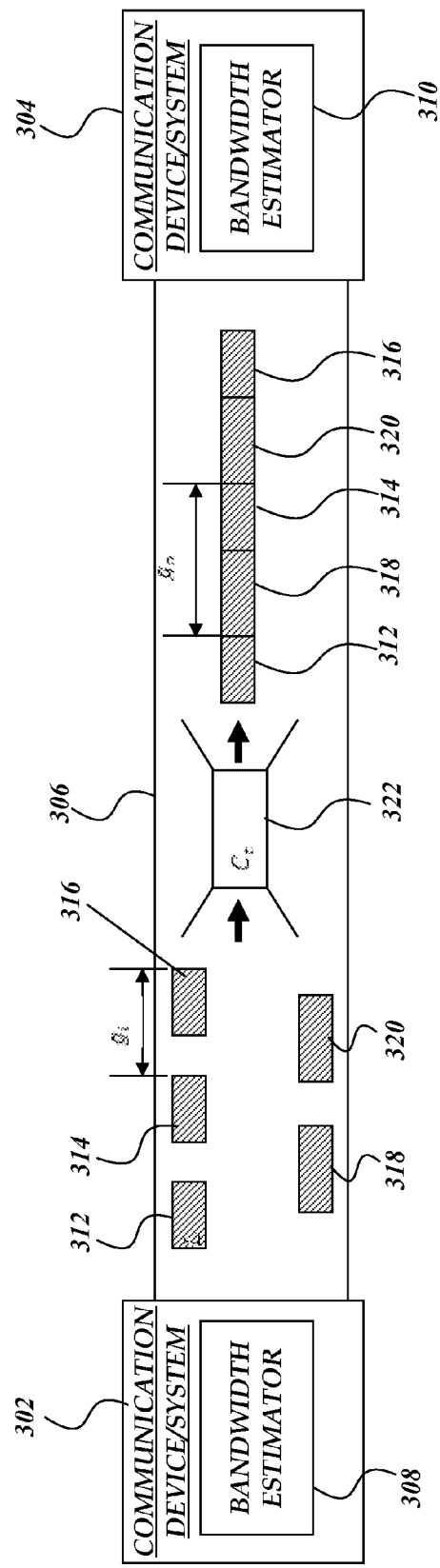
FIG. 3 depicts an exemplary communication system.

FIG. 3 is a block diagram depicting an exemplary communication system 300. As shown in FIG. 3, the system 300 of an embodiment includes a first communication device 302 communicating with a second communication device 304 using communication path 306, but is not so limited. For example, each device can include VOIP and/or video applications and associated components (e.g., packet transmitter/receiver, network interface(s), etc.) allowing the device users to communicate with one another using an end-to-end communication path that includes a number of communication links and/or other components as part of providing a real-time communication session. While two devices are shown, the various embodiments can include any number of devices and/or systems.

As shown in FIG. 3, device 302 includes a bandwidth estimator 308 and device 304 includes bandwidth estimator 310. In one embodiment, each bandwidth estimator can be configured as a program module that includes instructions that operate to provide capacity and bandwidth estimates for use in allocating available bandwidth to provide communication features to respective participants. Assume for this example that there are a sequence (n) of payload packets communicated by device 302 at times $s_0, s_1, \ldots, s_n$, wherein the lengths of the packets are $L_1, L_2, \ldots, L_n$. The transmitted gaps ($g_{i,k}$) between the packets transmitted from device 302 are $g_{i,0}, g_{i,1}, \ldots, g_{i,n}$.

After transmission, the payload packets are received at the device 304 at times $r_0, r_1, \ldots, r_n$, wherein the transmission times are based in part on aspects of the communication path 306 and other communication factors. Correspondingly, the received gaps ($g_{o,k}$) between the packets received at device 304 are $g_{o,0}, g_{o,1}, \ldots, g_{o,n}$. Thus, the transmitted packet gaps are equal to a time difference between successive packets (e.g., tracked by packet identification numbers (IDs)) as measured at the packet edges of the transmitted packets at time instance k (e.g., $g_{i,k}=s_k-s_{k-1}$, where k is an integer). Likewise, the received packet gaps are equal to a time difference between successive packets as measured at the packet edges of the received packets at time instance k (e.g., $g_{o,k}=r_k-r_{k-1}$).

In an embodiment, each bandwidth estimator can calculate the instantaneous sending rate of the payload as the result obtained by dividing the length of each probing packet by the transmitted packet gap (e.g., $R_{i,k}=L_k/g_{i,k}$). Each bandwidth estimator of the embodiment can also calculate the instantaneous receiving rate of the payload as the result obtained by dividing the length of each probing packet by the received packet gap (e.g., $R_{o,k}=L_k/g_{o,k}$).

As shown in FIG. 3, a communication state or snapshot is depicted in which the device 302 is transmitting a number of probing or probe packets 312, 314, and 316, referred to as probing traffic. Each probing packet includes a packet length (L), a leading edge (LE), and a trailing edge (TE). It will be appreciated that probing packets can be continuously or selectively transmitted over the communication path 306. For example, each device can transmit a predefined number of probing packets over the communication path 306 as part estimating available bandwidth during an initialization period as part of providing an interactive communication session.

After transmitting the predefined number of probing packets, probing packets can be selectively communicated and used by the bandwidth estimator 310 to provide a bandwidth estimate. The bandwidth and/or capacity estimates provided by the bandwidth estimator 310 can be used to control various communication parameters. For the exemplary communication state depicted in FIG. 3, the communication path 306 also includes a number of cross traffic packets 318 and 320. For example, other user and/or application traffic can contribute to cross traffic. It will be appreciated that a communication state can include various numbers of probing packets and cross traffic packets, but the embodiments are not so limited.

Cross traffic can be defined as any traffic that is included with a communication path and foreign to a communicating application of a respective device requiring bandwidth estimates as part of facilitating communications. For example, assume that a home user is using a browser and a VOIP application (e.g., OFFICE COMMUNICATOR, WINDOWS LIVE MESSENGER, etc.) to browse the web while making a VOIP call, wherein the VOIP application is using a bandwidth estimate to control communication operations between callers. For such an example, the browser traffic (e.g., inputs/outputs) is foreign to the current user VOIP application and analyzed as cross traffic. Additionally, as further example, shared routers and other communication components can include other user VOIP and non-VOIP traffic, both being foreign to the current user's applications and thus can be characterized as cross traffic.

As shown in FIG. 3, the exemplary system 100 of an embodiment includes a tight link 322 that includes a capacity ($C_t$). In one embodiment, each bandwidth estimator uses the tight link capacity ($C_t$ in bits per second (bps)) and a cross traffic rate at time instance k ($X_k$ (bps)) to determine an outgoing rate of the probing traffic. If the aggregated arrival rate $R_{i,k}+X_k$ at the tight link 322 is smaller than the capacity of the tight link $C_t$, the gap interval at which the probing packets exit the tight link ($g_{o,k}$) will be equal to the incoming probing gap ($g_{i,k}$). However, if the aggregated arrival rate $R_{i,k}+X_k$ at the tight link 322 is larger than the capacity of the tight link 322, then the outgoing rate of the probing traffic can be calculated as:

$$R_{o,k} = \frac{L_k}{g_{o,k}} = \frac{R_{i,k}}{R_{i,k} + X_k} * C_t \quad (1)$$

Each bandwidth estimator can then calculate an amount of available bandwidth ($A_k = C_t - X_k$) as:

$$A_k = C_t - \frac{C_t * g_{o,k} - R_{i,k} * g_{i,k}}{g_{i,k}} \quad (2)$$

Thus, an amount of available bandwidth can be determined using equation (2), where the amount is equal to the capacity of the tight link minus a quantity that equals the capacity of the tight link multiplied by a received gap value at a time instance minus an instantaneous sending rate at the time instance multiplied by a transmitted gap value at the time instance, wherein the quantity is further divided by the transmitted gap value at the time instance.

In an embodiment, each bandwidth estimator can be configured to reduce an amount of noise or other corruption when providing an estimate of an amount of available bandwidth and/or capacity by estimating a capacity value for a tight link and a rate value for the bandwidth estimate. The bandwidth estimator can operate to account for noise in the communication system 300 to obtain accurate sending and receiving gap measurements. For example, the bandwidth estimator can use a model to account for changing communication characteristics due in part to a payload packet traversing other network links with varying network characteristics, in addition to the narrow link estimates and cross traffic fluctuations.

The bandwidth estimator of an embodiment uses payload packets (e.g., pairs of probe packets) having high instantaneous sending rates, and ignores or partitions packets with low instantaneous sending rates when providing capacity estimates. For example, the bandwidth estimator can detect packet pairs having high instantaneous sending rates based in part on packet arrival times. For example, a high instantaneous sending rate exists when an inter-packet gap (e.g., time delay between successive data packets as measured at packet edges of consecutively received probe packets) is small or negligible, and/or the sending packet gap and the delay in receiving a first probe packet of a pair is small or negligible. Examples of packets communicated with high instantaneous sending rates include: video packets (e.g., full frames followed by smaller difference frames, wherein a full frame may be updated periodically (e.g., every 10 sec)), application/desktop sharing applications (e.g., sharing desktop application that results in high traffic on the path), web browsing (e.g., download all contents from a website upon a first visit, etc.).

As an example, the bandwidth estimator can use a series of packets having small sending packet gaps and that do not experience congestion (or minimal amounts of delay) over the communication path 306 as part of estimation operations. For example, a train of probe packets can be constructed to have a size small enough to experience minimal amounts of (or no) congestion as part of determining an accurate estimate of link capacity. A learning process can be used to obtain accurate estimates based in part on adjustments of packet pair parameters. In one embodiment, for each packet of an in-band measure, the bandwidth estimator operates to provide a capacity estimate as long as the received packet gap is larger than the transmitted packet gap (e.g., $g_{o,k} > g_{i,k}$). For the embodiment, the bandwidth estimator can calculate an estimate of capacity as:

$$C_{t,k} = \frac{L_k}{g_{o,k} - g_{i,k}}$$

That is, the bandwidth estimator provides a capacity estimate that is equal to the probe packet length divided by a quantity that is equal to a received packet gap value minus a transmitted packet gap value at each time instance for $g_{o,k} > g_{i,k}$. Based in part on the capacity estimate values, the bandwidth estimator uses a path capacity algorithm in conjunction with previously calculated or observed capacity estimates to obtain a capacity estimate for communication path 306. In one embodiment, the path capacity algorithm includes using a capacity histogram of the estimated capacity including the use of previously observed estimates, wherein the peak value of the capacity histogram can be used as a path capacity estimate for the current communication path (e.g., path capacity estimate for communication path 306).

The bandwidth estimator can then use the capacity estimate to estimate the available bandwidth of the communication path 306 using a bandwidth estimation algorithm. In one embodiment, the bandwidth estimation algorithm will use multiple samples of the receiving gap and sending gap, and calculate a bandwidth estimation using equation (2), and then use the average of the bandwidth estimation as the available bandwidth of communication path 306. Accordingly, the bandwidth estimator can use capacity estimates when calculating estimates of amounts of available communication bandwidth. Correspondingly, the bandwidth estimator of an embodiment can determine an amount of available bandwidth using an estimated capacity ($C_t$) of tight link 322 between a set of sending and receiving packet gap values. The bandwidth estimator 310 associated with device 304 can store a capacity and/or bandwidth estimate in memory and/or provide to other devices and/or systems (e.g., a communication server, processor-based communication device (including transmitting/receiving components), etc.).

In another embodiment, the bandwidth estimation algorithm is based in part on a regression process or methodology that operates to jointly determine available bandwidth and the capacity of a narrow link. For example, the bandwidth estimation algorithm can use a linear regression model based in part on equation (2) as follows:

Regression Equation:

$$(y) = a + b*x \quad (3)$$

Slope: $b = (N\Sigma XY - (\Sigma X)(\Sigma Y))/(N\Sigma X^2 - (\Sigma X)^2)$
Intercept: $a = (\Sigma Y - b(\Sigma X))/N$
Where,
N is a number of values,
X is a first value, with $x = 1 - (g_{o,k}/g_{i,k})$ is a parameter calculated from the ratio between a receiving gap and a sending gap.
Y is a second value, with $y = R_{i,k}$ is an instantaneous sending rate,
$\Sigma(X*Y)$ represents a sum of the product of first and second values,
$\Sigma(X)$ represents a sum of the first values,
$\Sigma(Y)$ represents a sum of the second values, and
$\Sigma(X^2)$ represents a sum of squared first values.

Using multiple samples of the sending rate, the receiving gap and the sending gap can be used to calculate the slope b and the intercept a, the available bandwidth and capacity can be derived as:

$C_t$=b, the slope of the regression line is the capacity. Note that the capacity obtained is based on the capacity of the tight link, rather than the capacity of the path (the capacity of the narrow link).

$A_k$=−a, the intercept point is the available bandwidth.

For example, device 304 can use the bandwidth estimator 310 to provide feedback communications to device 302 requesting communication of additional probing packets and/or variation of probing packets parameters (e.g., delay, periodicity, size of the probing packet, etc.). As another example, a conferencing server can use a communicated bandwidth estimate to facilitate multimedia communications over packet-based, hybrid, and other networks to communicating participants who are communicating using audio, video, application sharing, and/or other communication modes.

Figure 4:
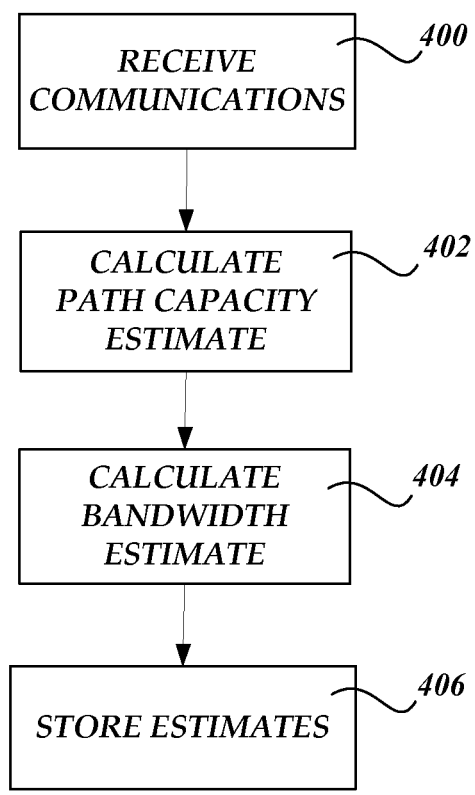
FIG. 4 is a flow diagram depicting an exemplary process of providing a bandwidth estimate.

FIG. 4 is a flow diagram illustrating an exemplary process of providing a bandwidth estimate for a communication path. As described below, a number of probe packets can be used as part of the process to provide bandwidth estimates. For example, a training process can use aspects of communicated probe packets during initialization to provide bandwidth estimates for use in controlling bandwidth distribution to a number of communication modalities (voice, video, desktop sharing, etc.). In an embodiment, one or more components (e.g., server, client, network component, etc.) of a packet-based communication environment can use the process as part of obtaining bandwidth estimates. In one embodiment, a participant device or system can use the process in conjunction with a communication client to provide bandwidth estimates. In another embodiment, a server component can use the process to provide bandwidth estimates based in part on a channel or path communication state(s), prior communication parameters, current communication parameters, and/or other parameters for example.

The process of an embodiment can be used to determine an amount of available communication bandwidth associated with a packet-based communication session. For example, the exemplary process can be encoded with a bandwidth estimation component and used to assess parameters of received probe packets (e.g., set of packet pairs) as part of initializing a communication session. In one embodiment, packet pairs can be used in conjunction with Real time Transport Protocol (RTP) (e.g., RFC 355) Control Protocol (RTCP) packets, to continuously probe links of a communication path.

As discussed below, the process can be used to adapt to dynamic traffic and network conditions associated with a real-time conferencing session. For example, the process can be used to provide bandwidth estimates in various communication architectures (e.g., using cable modems that follow policies involving token buckets, round-robin service, special service for the first packet in a burst, etc.). It will be appreciated that various users can use different communication components (e.g., using laptops, desktops, smart phones, other portable devices, etc.) and/or paths (e.g., LAN links, WAN links, etc.) as part of interacting with others during a particular communication session. For example, bandwidth estimates can be provided to a smart phone being used to participate in a live conference with a laptop user.

Referring to FIG. 4, the process of one embodiment can be used in conjunction with a communicating device or system to provide a bandwidth estimate, but is not so limited. At 400, the process of one embodiment, receives communications over a communication path including communicated probe packets. For example, a communication device can operate to receive communicated probe packets from a transmitting device or system, wherein the communicated probe packets include received packet gaps and corresponding origination packet gaps (e.g., as measured at the transmitting device or transmitter). For example, received packet gaps result from aspects of packet communications over a particular communication path (e.g., delay, jitter, etc.), and the origination packet gaps correspond with the communicating device or system's communication functionality (e.g., transmitter configuration, processor capability, etc.).

At 402, the process calculates a path capacity estimate for the communication path based in part on parameters of the communicated probe packets. In one embodiment, the process operates to calculate a path capacity estimate for the communication path based in part on calculated link capacity estimates and a congestion threshold using select pairs of communicated probe packets. For example, the process can use communicated probe packets having high instantaneous sending rates or minimal delay (e.g., uncongested (non-congested) packets) to calculate capacity estimates. At 404, the process operates to calculate a bandwidth estimate based in part on the path capacity estimate and a bandwidth estimation model. For example, the process can base the path capacity estimate in part using a tight link capacity or estimate and a histogram analysis, and use a linear regression process or model to determine a bandwidth estimate based in part on a path capacity estimate. At 406, the estimates are stored in memory. For example, bandwidth and/or capacity estimates can be stored locally and/or remotely.

As one example, the process can be used to provide bandwidth estimates to communicating devices/systems as part of using a multimedia conference server and network architecture to host multiple conferences and/or participants. Communicating devices and/or systems include processor-based functionality that typically includes at least one processor and memory, multimedia input/output (I/O), and other components (e.g., microphones, speakers, video camera, display, keyboard, thumb board, keypad, touch screen, stylus, VOIP components, Internet components, network components, wireless and/or wired network components, etc.). Exemplary conferencing components include MICROSOFT OFFICE COMMUNICATOR components, MICROSOFT OFFICE LIVE MEETING components, and other multi-modal communication components that implement any appropriate application programs and user interface controls to enable multimedia conferencing. While a certain number and order of operations is described for the exemplary flow of FIG. 4, it will be appreciated that other numbers and orders can be defined according to a desired implementation.

Figure 5A:
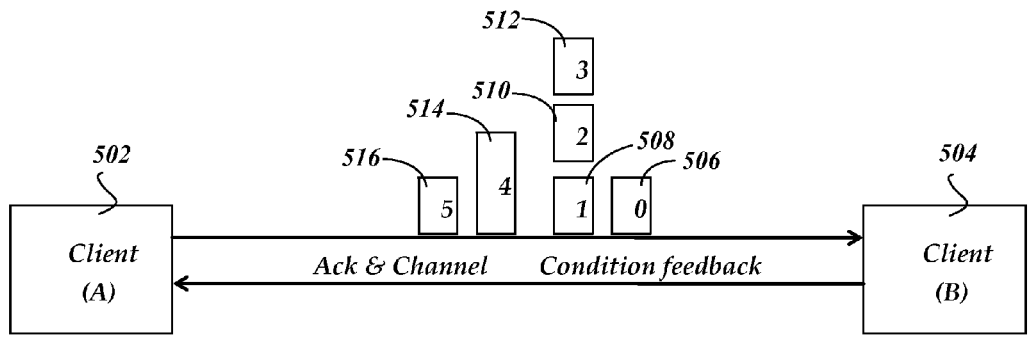
FIGS. 5A-5C are block diagrams depicting communication states of an exemplary communication environment.
Figure 5B:
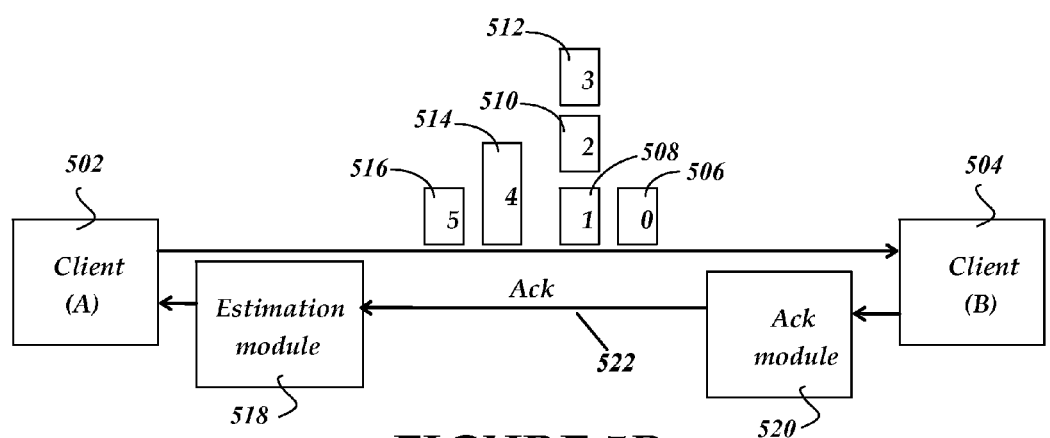
Figure 5C:
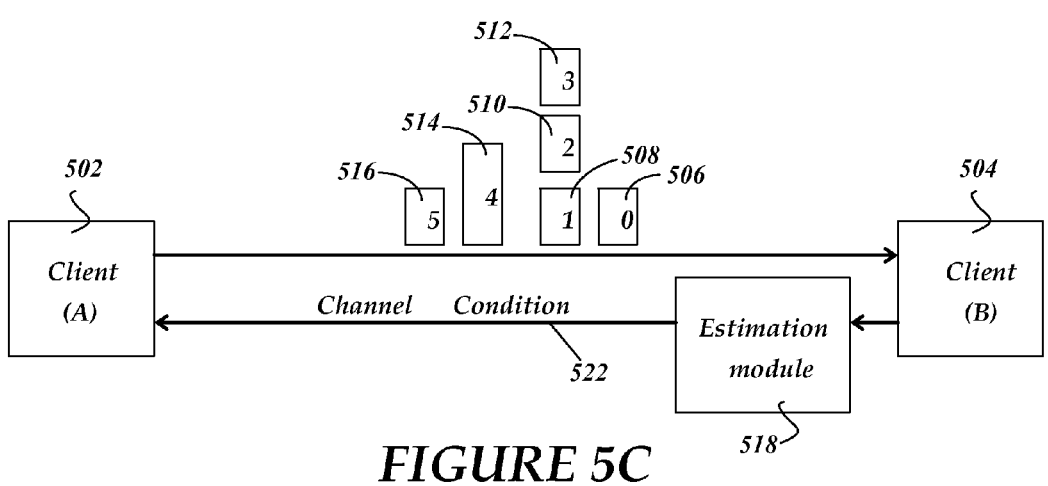

FIGS. 5A-5C are functional block diagrams depicting exemplary component configurations of a communication environment 500. As shown in FIG. 5A, client 502 (client (A)) is in communication with client 504 (client (B)) using a communication channel or path in accordance with an embodiment. For example, the clients may be communicatively engaged as part of a VOIP session, a video conferencing session, a gaming session, a cloud application environment (e.g., OFFICE Online), a Terminal service session, etc. The description below is based in part on aspects of communications from client 502 to client 504 (e.g., A→B). It will be appreciated that the exemplary protocol and estimation algorithm can be applied for communications from client 504 to client 502.

As shown in FIG. 5A, client 502 has transmitted a sequence of packets 506-516 to the client 504. In various embodiments, the sequence of packets 506-516 can be of varying sizes, and/or sent at different intervals/times. In one embodiment, the sequence of packets 506-516 results from a multiplexing of multiple sequences of packets from various applications. As an example, in a video conferencing session, a dedicated voice channel may generate packets at 50 frames per second (fps), with each packet having an approximate size of 60 bytes, resulting in a voice stream at about 24 kbps.

Continuing with the example, a dedicated video channel may generate packets at about 15 fps. At every 10 seconds or so, an I-frame can be generated at 15000 bytes (e.g., 10 packets at 1500 bytes each). At every second or so, a SP-frame (e.g., H.264 standard) can be generated with reference coding to the previous I/SP frame at 4500 bytes (e.g., 3 packets at 1500 bytes each). At every 66 milliseconds (ms) or so, a P-frame can be generated at 1000 bytes (e.g., 1 packet). The resultant audio and video channel states can be multiplexed together to form a combined sequence of communication packets. As shown, an in-band estimation module 518 operates to estimate current channel conditions, including available bandwidth using aspects of the sequence of data packets 506-516. In one embodiment, the estimation module 518 operates to estimate current channel conditions without relying on extra probe packets.

FIG. 5B depicts an embodiment of the exemplary environment 500 that uses an acknowledgement (ACK) module 520 included with or at client 504. For such an embodiment, the client 502 includes and/or uses the estimation module 518 to perform in-band bandwidth estimation operations based in part on information communicated by the acknowledgement module 520. The acknowledgement module 520 of an embodiment operates to acknowledge the receipt or the non-receipt (e.g., loss) of transmission packets back to the estimation module 518 through a backend channel 522. In one embodiment, the backend channel 522 can be implemented as a dedicated channel.

In another embodiment, the backend channel 522 is provided using a piggy back technique to append information to a payload as part of a communication from client 504 to client 502. For example, as part of communicating an audio and/or a video stream from client 504 to client 502, information can be merged with and/or appended to the data payload to provide backend channel information or backend channel 522. In TCP protocol, feedback information (e.g., ACK communication) is piggy backed onto data packets. In an alternate embodiment, the acknowledgement module 520 can apply a timestamp of other temporal indication with the receipt/non-receipt information to further advance estimation accuracy. The client 502 of one embodiment uses an acknowledgement signal of a communication protocol (e.g., TCP ACK packets) and avoids protocol modifications.

FIG. 5C depicts another embodiment of the exemplary environment 500 wherein client 504 includes and/or uses the estimation module 518 to perform in-band bandwidth estimation operations based in part on packets received and/or not received at the client 504. For example, the estimation module 518 can be used by the client 504 to estimate channel conditions that include, but are not limited to, packet loss characteristics, jitter characteristics, and/or available bandwidth estimates that can be communicated back to client 502. The configuration of FIG. 5C can provide enhanced estimation accuracy since acknowledgement information is not required (but can be used to enhance communications in other embodiments), and the estimation can be based on received timestamps and/or loss patterns of a sequence of the packets. Thereafter, aggregated channel estimates can be sent to client 502. In one embodiment, a communication protocol can be modified to enable communication of aggregated channel estimates over backend channel 522.

The components of FIGS. 5A-5C can be used in estimating a number of channel conditions based in part on in-band estimation techniques. For example, the estimation techniques can be used to provide packet loss characteristics, jitter characteristics, and/or available bandwidth estimates. A packet loss characteristic can be based on a packet loss ratio (e.g., a percentage of a packet lost in transmission) and can also include more detailed measures (e.g., burst loss probability defined as percentage of cases where r-packets are lost in a row, with r being 2, 3, 4, 5, etc.). A jitter characteristic can be based on a variance of the jitter (e.g., packet delay) observed during some period or session. Jitter can also be estimated as the k-th-percentile jitter (e.g., k being 90-percent, 99-percent, etc.) observed. Available bandwidth of a communication channel or path can be based in part on an amount of residual bandwidth of a tight link that is based in part on a delay spread of received packets, as described above.

In one embodiment, the estimation module 518 can operate to determine a channel estimate based in part on parameters of particular packets received/lost (e.g., for a packet loss characteristic), a time that a packet is sent and a time that the corresponding acknowledgement packet is received (e.g., for a jitter characteristic and available bandwidth estimate), and/or a size of each packet (e.g., for available bandwidth estimation). A receiving time of a packet can be used by the estimation module 518 as part of providing channel and/or communication characteristics (see FIG. 5B). In one embodiment, client 504 can operate to send a receiving time of each packet to client 502 and/or estimation module 518. In another embodiment, the client 504 can be configured to not acknowledge nor provide an actual received timestamp but acknowledges a receipt/non-receipt of each individual packet.

The estimation module 518 of one embodiment can obtain an estimate of a receiving time of a sent packet based in part on the use of a transmit time of a received acknowledgement packet. For example, the estimation module 518 can use the times associated with when a packet is sent and when a corresponding acknowledgement packet is received to estimate a round trip packet time. The estimated round trip time can be used to obtain derivative channel estimates, such as jitter and/or available bandwidth estimates for example. The estimation module 518 of another embodiment can use unique packet IDs to calculate an associate packet loss characteristic of a communication channel in use.

The estimation module 518 of one embodiment can estimate a jitter characteristic and the available bandwidth information based in part on the use of sent timestamps of the sequence of packets (e.g., included in the payload), which can be used in part to correct or compensate for clock drift between the clients. In an embodiment, a communication protocol can be used to establish a set of implicit rules of sending timestamps, so that a receiving client can calculate a sending timestamp even if the specific information is not included in a payload. For example, the sending timestamp of an ith audio packet can be automatically derived as 20*i ms assuming that one packet is sent every 20 ms (at a rate of 50 fps) for an audio channel.

As further example, packets associated with an ith video frame has a base timestamp of 66*i ms assuming that one frame is sent every 66 ms (at a rate of 15 fps) for a video channel. Further, if there are M packets in the coded ith video frame, and each packet is spread apart from the previous video packet by 2 ms, then the sending timestamp of the jth video packet in the ith video frame can be calculated as 66*i+2*j ms. Correspondingly, clients can negotiate a set schedule for a sequence of packets to be sent, wherein a receiving client can calculate a sending time stamp according to an associated schedule. The estimation module 518 can operate to calculate relative time information (e.g., sending time gap and the receiving time gap) of a sequence of packets even if the sending timestamp and the receiving timestamp are not available.

The estimation module 518 can also operate to correct for clock drift between communicating clients to obtain delay information (e.g., i.e., packet jitter). In one embodiment, the estimation module 518 can correct clock drift based in part on an identification and use of a set of packets in a sequence that are congestion free as part of resetting a timestamp between clients and thereby synchronize client clocks. A congestion free period or sequence can use sending timestamps $s_0, s_1, \ldots, s_n$ and receiving timestamps $r_0, r_1, \ldots, r_n$ by dividing an entire sequence of packets into a separate grouping or classification.

For example, a defined period of time (e.g., one second) can be used as a group size to divide a sequence of packets into groups. Within each group, the estimation module 518 of an embodiment uses a packet having a smallest value of $r_i - s_i$ and assumes that, within each group, the clock drift is small enough to be considered constant. Thus, packets that experience the least amount of delay (e.g., a smallest value of $r_i - s_i$ of each group) can be treated as congestion free packets. The estimation module 518 of an embodiment processes the congestion free packets using a linear regression model, similar to the one described above.

For clock drift correction of one embodiment use the following:

$$s_j = \alpha + (1+\beta) r_i, \quad (4)$$

Where, $s_j$ is the sending timestamp of the packet that experiences the least amount of delay in group j, $r_i$ is the receiving timestamp of the packet that experiences the least amount of delay in group i, $\alpha$ is the constant offset of the clock drift, $\beta$ is the first order offset of the clock drift.

Using the sending timestamp and receiving timestamp of a set of packets that experiences the least amount of delay, a linear regression technique (e.g., see [0050]-[0064]) can be used to calculate a clock drift parameter.

By substituting:

$$r'_i = \alpha + (1+\beta) r_i,$$

the receiving timestamp $r_i$ of each ith packet can be translated into the sending (originating) clock domain.

An alternative method of clock drift compensation directly utilizes information of the sending and the receiving gaps with the assumption that the network is congestion free for certain packets (e.g., receiving gap is equal to the sending gap of consecutive packets). Thus, the jitter (e.g., queuing delay) of an ith packet be denoted as $d_i$ and can be updated using the sending and receiving gaps through the following self-synchronization mechanism of an embodiment:

$$d_i = \begin{cases} 0, \\ d_{i-1} + g_{o,i} - g_{i,i} \end{cases}$$

sending gaps equal receiving gaps for a number of packets, or i=0 otherwise.

Thus, an amount of jitter can be calculated using sending and receiving packet gaps as shown above. After compensating for clock drift, a sending timestamp and the receiving timestamp can be used by the estimation module 518 to calculate jitter characteristics of the network channel. The estimation module 518 can also operate to estimate available bandwidth based in part on the capacity of a tight link, as described above using equation (1) to calculate an outgoing rate of probing traffic and equation (2) to calculate an amount of the available bandwidth. Alternatively, a linear regression model or technique can be applied to estimate the capacity and available bandwidth jointly.

Various embodiments can be implemented as a computer process (e.g., a method), a computing system/device, an article of manufacture, such as a computer program product or computer readable media, computer readable storage medium, and/or as part of various multi-modal communication architectures. An exemplary computer program product can include computer storage media that includes instructions useable by a computing entity. Certain embodiments for controlling multimedia can vary depending upon a set of communication protocols or standards used (e.g., Session Initiation Protocol (SIP)) and other signaling standards and/or variants.

For example, a multimedia communication environment can be implemented in accordance with International Telecommunication Union (ITU) H.323 standards that include a multipoint control unit (MCU) to coordinate conferencing operations, such as the H.245 signaling and other operations, and one or more multipoint processors (MP) to mix and process signal streams. Other signaling protocols can be used (e.g., SIP Instant Messaging and Presence Language Extensions (SIMPLE), Real-time Transport Protocol (RTP), etc.).

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components (e.g., servers). While certain embodiments include software implementations, they are not so limited and encompass hardware, or mixed hardware/software solutions. Other embodiments and configurations are available.

Exemplary Operating Environment

Figure 6:
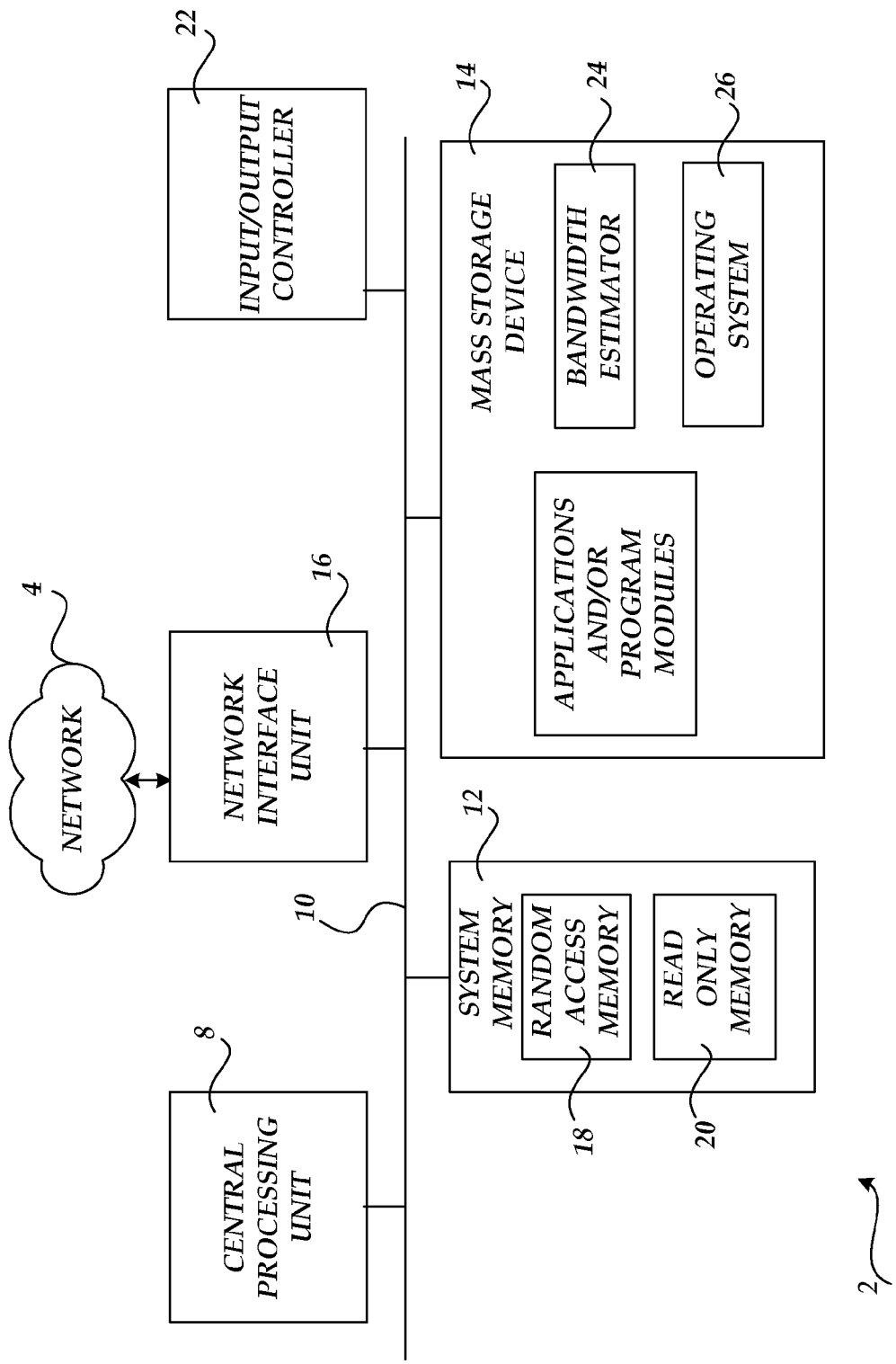
FIG. 6 is a block diagram illustrating a computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a bandwidth estimation component or estimator 24, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system comprising:
 a communication path for communicating information including packets,
 a bandwidth estimator to provide an estimate of an amount of available bandwidth associated with the communication path based in part on an assessment of payload packet parameters of the packets communicated over the communication path, the bandwidth estimator operable to:
  determine a first packet gap comprising a transmitted packet gap measured as a time difference between a pair of transmitted packets at a time instance;
  determine a second packet gap comprising a received packet gap measured as a time difference between a pair of received packets at the time instance;
  determine a path capacity estimate based in part on a packet length divided by the difference of the received packet gap and the transmitted packet gap for packets that do not experience a defined amount of congestion; and,
  use the path capacity estimate in part to determine the estimate of the amount of available bandwidth based in part on the packets that do experience the defined amount of congestion; and,
 memory to store the estimate of the amount of available bandwidth.

2. The system of claim 1, the bandwidth estimator further operable to determine the path capacity estimate based in part on a tight link capacity estimate.

3. The system of claim 2, the bandwidth estimator further operable to determine the path capacity estimate using a histogram and a number of previously calculated link capacity estimates.

4. The system of claim 2, the bandwidth estimator further operable to determine the path capacity estimate by using a peak occurrence of a capacity histogram.

5. The system of claim 4, the bandwidth estimator further operable to determine the estimate of the amount of available bandwidth using a regression model.

6. The system of claim 4, the bandwidth estimator further operable to determine the estimate of the amount of available bandwidth and capacity of a tight link jointly using a linear regression method.

7. The system of claim 1, the bandwidth estimator further operable to determine a link capacity estimate if a received packet gap value is larger than a transmitted packet gap value.

8. The system of claim 1, the bandwidth estimator further operable to classify received probe packets using packet classes based in part on congested and uncongested network conditions.

9. The system of claim 8, the bandwidth estimator further operable to classify received probe packets in a first packet class corresponding to congested packets and a second packet class corresponding to uncongested packets.

10. The system of claim 8, the bandwidth estimator further operable to use packet parameters of a first packet class to calculate capacity of the communication path and packet parameters of a second packet class to calculate available bandwidth estimates and capacity estimates of a tight link.

11. A method of communicating comprising:
receiving a number of payload packets over an end-to-end communication path, wherein the end-to-end communication path includes a number of cross-traffic packets;
receiving delivery information of the payload packets;
estimating a sending timestamp of each payload packet;
obtaining a receiving timestamp of each payload packet; and,
estimating network channel characteristics based in part on the delivery information, and the sending and receiving timestamps of the payload packets including determining a path capacity estimate based in part on a packet length divided by a difference of a received packet gap and a transmitted packet gap for packets that do not experience a defined amount of congestion and using the path capacity estimate in part to determine the estimate of the amount of available bandwidth based in part on the packets that do experience the defined amount of congestion, wherein the transmitted packet gap is measured as a time difference between a pair of transmitted packets at a time instance and the received packet gap is measured as a time difference between a pair of received packets at the time instance.

12. The method of communicating of claim 11 further comprising estimating the sending timestamp of each payload packet based in part on a pre-determined schedule.

13. The method of communicating of claim 11 further comprising calculating a jitter characteristic of the end-to-end communication path based in part on synchronized sending and receiving timestamps.

14. The method of communicating of claim 11 further comprising calculating a jitter characteristic of the end-to-end communication path based in part on a self-synchronized jitter calculation that includes using transmitted packet gap and received packet gap parameters.

15. The method of communicating of claim 11, further comprising:
calculating an amount of available bandwidth of the end-to-end communication path by:
classifying a first set of packets, wherein the first set of packets are associated with a first communication time over the end-to-end communication path;
classifying a second set of packets, wherein the second set of packets are associated with a second communication time over the end-to-end communication path;
providing a capacity estimate based in part on the first set of packets and a capacity estimate histogram; and,
providing a bandwidth estimate based in part on the second set of packets and the capacity estimate histogram; and,
storing the bandwidth estimate in memory.

16. A communication device comprising:
a transmitter to transmit communications that include packets of information over a communication path;
a receiver to receive communicated packets over the communication path, the communicated packets having received packet gaps, wherein the communicated packets have corresponding transmitted packet gaps;
a bandwidth estimator to calculate a path capacity estimate for the communication path based in part on calculated link capacity estimates and a congestion threshold using select pairs of communicated packets, and to calculate a bandwidth estimate based in part on the path capacity estimate and a bandwidth estimation model including determining the path capacity estimate based in part on a packet length divided by a difference of a received packet gap and a transmitted packet gap for the communicated packets that do not experience a defined amount of congestion and using the path capacity estimate in part to determine the bandwidth estimate based in part on the communicated packets that do experience the defined amount of congestion, wherein the transmitted packet gap is measured as a time difference between a pair of transmitted packets at a time instance and the received packet gap is measured as a time difference between a pair of received packets at the time instance; and
memory to store the bandwidth estimate.

17. The device of claim 16, wherein the bandwidth estimator operates to correct for clock drift.

18. The device of claim 16, wherein the bandwidth estimator operates to calculate jitter characteristics of a network.

19. The method of communicating of claim 11 further comprising calculating a packet loss characteristic of the path based in part on the delivery information.

20. The method of communicating of claim 19 further comprising synchronizing a sending and a receiving clock by using a set of non-congested packets and calculating a clock drift parameter using a linear regression model and the set of non-congested packets.

* * * * *